United States Patent
Maeda et al.

[11] Patent Number: 6,148,141
[45] Date of Patent: Nov. 14, 2000

[54] IMAGE PICKUP SYSTEM WITH SEPARABLE/ATTACHABLE IMAGE PICKUP DEVICE AND DISPLAY DEVICE

[75] Inventors: Masamine Maeda, Chiba; Kazuhiro Takahashi, Tokorozawa; Hideyuki Arai, Kawasaki; Hirofumi Takei, Yokohama; Motoi Tariki, Machida, all of Japan

[73] Assignee: Canon Kabushiki Kaisha, Tokyo, Japan

[21] Appl. No.: 08/841,564

[22] Filed: Apr. 30, 1997

[30] Foreign Application Priority Data

May 10, 1996 [JP] Japan ................................... 8-116479
Mar. 17, 1997 [JP] Japan ................................... 9-062892

[51] Int. Cl.$^7$ .................................................. H04N 5/917
[52] U.S. Cl. ............................. 386/112; 386/117; 348/232
[58] Field of Search ............................. 386/38, 117, 118, 386/120; 348/207, 220, 212, 232, 233, 372, 373, 374, 333, 222; 358/906, 909.1; 375/260

[56] References Cited

U.S. PATENT DOCUMENTS

| | | | |
|---|---|---|---|
| 4,864,589 | 9/1989 | Endo | 375/1 |
| 5,091,787 | 2/1992 | Watanabe et al. | 348/233 |
| 5,170,262 | 12/1992 | Kinoshita et al. | 386/118 |
| 5,381,179 | 1/1995 | Kashimura | 348/372 |
| 5,568,205 | 10/1996 | Hurwitz | 348/723 |
| 5,734,787 | 3/1998 | Yonemitsu et al. | 386/111 |
| 5,754,227 | 5/1998 | Fukuoka | 348/232 |
| 5,956,372 | 9/1999 | Vaman et al. | 375/260 |

FOREIGN PATENT DOCUMENTS 0 501 699 A2  2/1992  European Pat. Off. ......... H04N 7/13

Primary Examiner—Wendy Garber
Assistant Examiner—Christopher Onuaku
Attorney, Agent, or Firm—Fitzpatrick, Cella, Harper & Scinto

[57] ABSTRACT

An image pickup system comprising an image pickup device including an image pickup element for pickup the image of an object and outputting image data, a compression encoding circuit for effecting compression encoding of the image data, a wireless transmission circuit for modulating the compression encoded image data and transmitting the data to a wireless transmission channel, and a first connector adapted to be electrically and mechanically connected, in detachable manner, to a display device for displaying the image picked-up by the image pickup element and to transmit the image data from the image pickup element; and a display device including a wireless reception circuit for receiving the transmitted image data from the wireless transmission channel and demodulating the image data, an expansion circuit for expanding the demodulated image data to obtain first image data, a second connector adapted to be electrically and mechanically connected, in a detachable manner, to the first connector and to receive second image data from the image pickup device, a signal processing circuit for selectively receiving the first or second image data and processing the received image data to output an image signal of a predetermined format, and a monitor for displaying the image signal of the predetermined format.

18 Claims, 14 Drawing Sheets

IMAGE PICKUP SYSTEM WITH SEPARABLE/ATTACHABLE IMAGE PICKUP DEVICE AND DISPLAY DEVICE

BACKGROUND OF THE INVENTION

1. Field of the Invention

The present invention relates to an image pickup device adapted for use in a camcorder (camera-integrated video cassette recorder), a display device for displaying the picked-up image; and an image pickup system consisting of the image pickup device and the display device.

2. Related Background Art

In the conventional camcorder (camera-integrated video cassette recorder), an image pickup unit and an image display unit including a monitor and a VCR (video cassette recorder) are mutually inseparably integrated. For this reason, in case of image pickup by placing such camcorder in a place unreachable by the photographer, the image to be picked-up cannot be confirmed on the monitor.

For avoiding such drawback, there has been known a camcorder in which an image pickup unit and an image display unit are separated as shown in FIG. 14.

In FIG. 14, there are shown an image pickup unit 10, an image display unit 11, a lens 1 for forming the image of an object, an image pickup device 2 for converting the formed image of the object into an image signal, a CDS/AGC circuit 3 for effecting sample holding of the image signal, thereby obtaining an appropriate signal level, a digital signal processing unit 4 for effecting A/D conversion on the image signal from the CDS/AGC circuit 3 and effecting digital signal processing, an NTSC encoder 5 for converting the digital image signal from the digital signal processing circuit 4 into an NTSC image signal, a cable 6 connecting the image pickup unit 10 and the image display unit 11, a monitor 7 for displaying the NTSC image signal supplied from the image prising image pickup means for pickup the image of an object and outputting image data, first compression encoding means for compression encoding of the image data, wireless transmission means for modulating thus compression encoded image data for transmission to a wireless transmission channel, and connection means adapted to be mechanically and electrically connected in detachable manner to a display device for displaying the image picked-up by the image pickup device and to transmit the above-mentioned image data from the image pickup means.

Also according to the present invention, there is provided a display device comprising wireless reception means for receiving and demodulating the compression encoded and modulated image data from the wireless transmission channel, first expansion means for expanding thus demodulated image data thereby obtaining first image data, connection means adapted to be mechanically and electrically connected in detachable manner to the image taking device and to receive second image data from the image pickup device, signal processing means for selectively receiving the first and second image data and processing thus received image data to output an image signal of a predetermined system, and display means for displaying the image signal of the above-mentioned predetermined system.

Also according to the present invention, there is provided an image pickup system comprising an image pickup device including image taking means for taking the image of an object and outputting image data, compression encoding means for compression encoding of the image data, wireless transmission means for modulating thus compression encoded image data for transmission to wireless transmission channel, and first connection means adapted to be mechanically and electrically connected in detachable manner to a display device for displaying the image picked-up by the image pickup device and to transmit the above-mentioned image data from the image pickup means; and a FIG. 8 is a block diagram showing an image display unit in the third embodiment;

DETAILED DESCRIPTION OF THE PREFERRED EMBODIMENTS

In the following there will be explained first to fifth embodiments in which the present invention is applied to a camcorder, with reference to the attached drawings. In FIGS. 1 to 13, mutually corresponding components are represented by a same number and will not be explained repeatedly.

Figure 1:
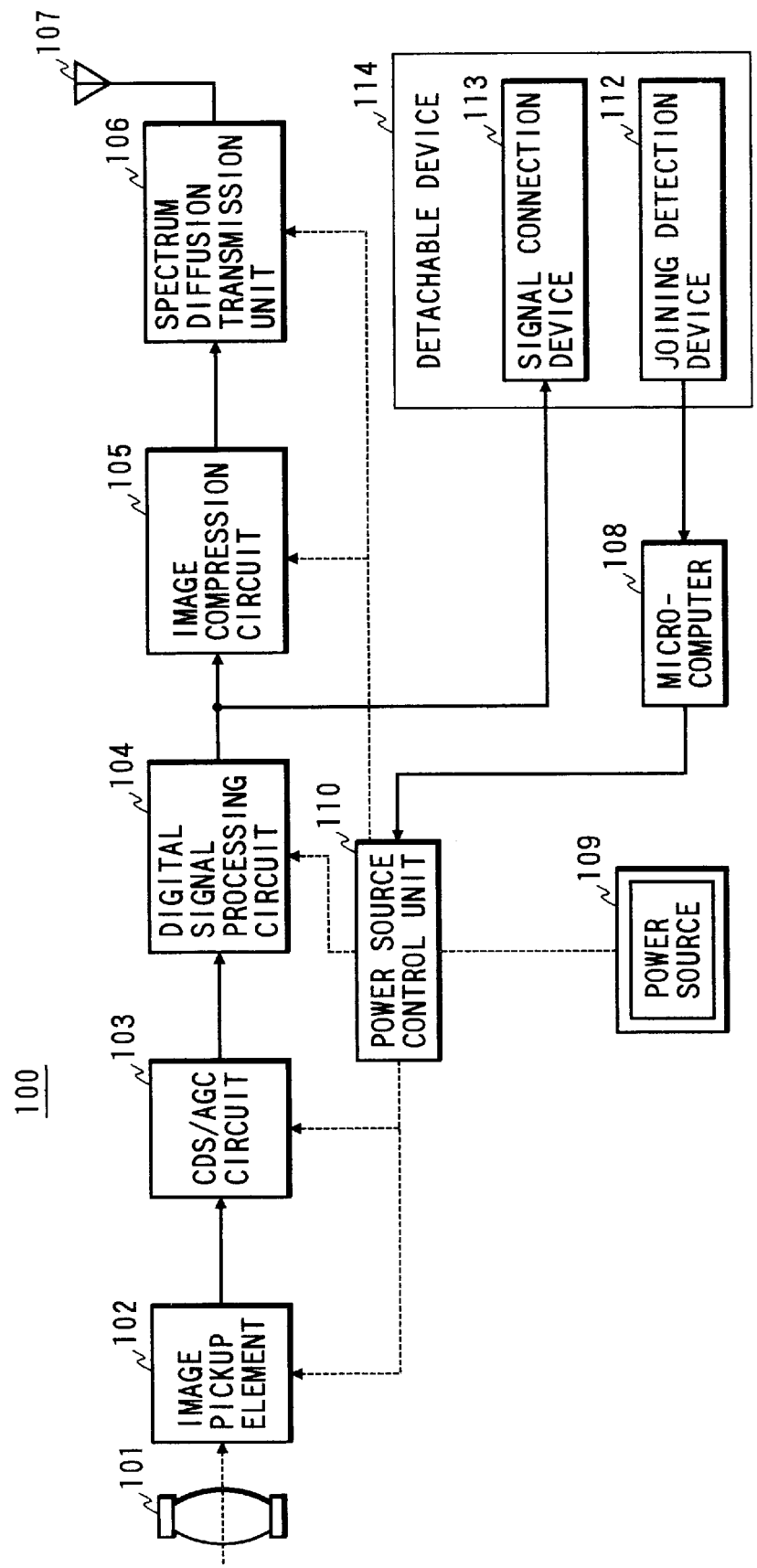
Figure 2:
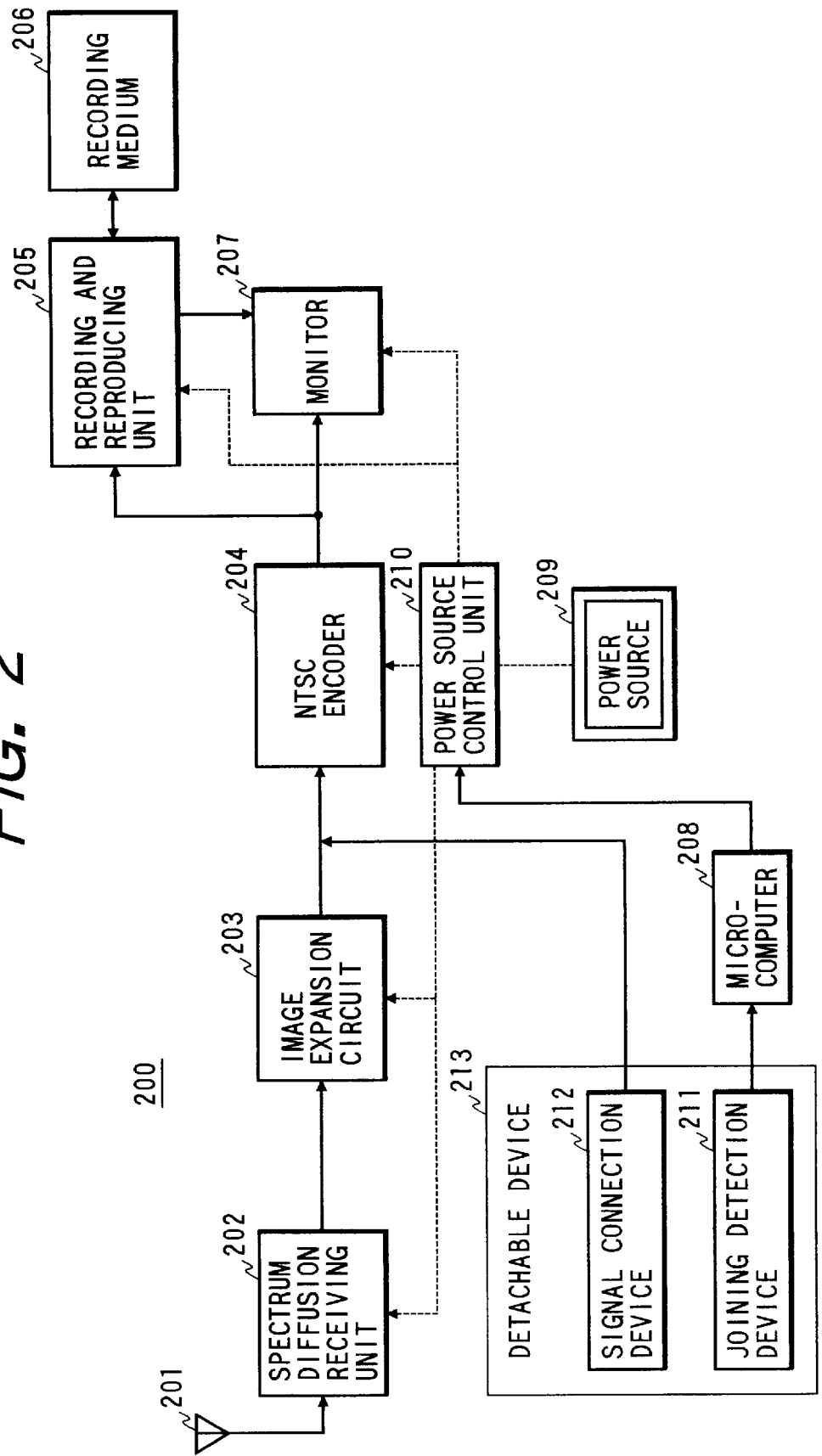

FIG. 1 is a block diagram of an image pickup unit 100 of a camcorder in a first embodiment of the present invention, and FIG. 2 is an image display unit 200 of the camcorder.

In the image pickup unit 100 shown in FIG. 1, there are provided a lens 101 for forming the image of an object, an image pickup device 102 for converting thus formed image into an image signal, a CDS/AGC circuit 103 for effecting sample holding on the image signal thereby providing an appropriate signal level, a digital signal processing circuit 104 for A/D conversion of the image signal from the CDS/AGC circuit 103 and digital signal processing, an image compression circuit 105 for compression encoding of the digital image signal from the digital signal processing circuit 104, a spectrum diffusion transmission circuit 106 for transmitting the compressed image data from the image compression circuit 105 by spectrum diffusion modulation, and a transmitting antenna 107.

There are also provided a microcomputer 108, a power source 109, a power source control unit 110 for on/off control of the power supply to various units according to commands from the microcomputer 108, a joining detection device 112 for detecting that an image display unit 200 to be explained later is coupled, a signal connection device 113 for connecting the digital signal processing circuit 104 with the image display unit 200 when it is coupled, and an attaching/detaching device 114 including the joining detection device 112 and the signal connection device 113 and adapted to electrically and mechanically connect, in detachable manner, to the image display unit 200.

In the image display unit 200 shown in FIG. 2, there are provided a receiving antenna 201, a spectrum diffusion reception unit 202 for receiving the image data transmitted from the image pickup unit 100 and effecting demodulation to restore the compressed image data, an image expansion unit 203 for expanding the compressed image data to obtain the digital image signal, an NTSC encoder 204 for converting the digital image signal into the NTSC image signal, a recording/reproducing unit 205 for recording and reproducing the NTSC image signal, a recording medium 206, and a monitor 207 for displaying the NTSC image signal.

There are also provided a microcomputer 208, a power source 209, a power source control unit 110 for on/off control of the power supply to various unit according to commands from the microcomputer 208, a joining detection device 211 for detecting that the image display unit 100 is coupled, a signal connection device 212 for connecting the NTSC encoder 204 with the image pickup unit 100 when it is coupled, and an attaching/detaching device 213 including the joining detection device 211 and the signal connection device 212 and adapted to electrically and mechanically connect, in detachable manner, to the image pickup unit 100.

The image compression circuit 105 mentioned above can also be a pixel thinning-out circuit for processing the digital image signal from the digital signal processing circuit 104 in the unit of each pixel and reducing the number of pixels by pixel thinning-out. Also the image expansion circuit 203 mentioned above can also be a pixel interpolation circuit for processing the digital image signal from the spectrum diffusion reception unit 202 in the unit of each pixel to effect interpolation of the pixels.

In the above-explained configuration, when the image pickup unit 100 and the image display unit 200 are mutually separated, the image picked-up by the image pickup unit 100 is transmitted by wireless transmission to the image display unit 200 in a distant location and can be monitored and/or recorded and reproduced therein. Consequently the photographer can place the image pickup unit 100 in a distant location, without being concerned with the location of the image display unit 200, whereby freedom of the image pickup operation can be increased. It is also possible to take out the picked-up image from the signal connection device 113 and send it to an external equipment such as a computer. It is furthermore possible to supply the signal connecting device 212 of the image display unit 200 with the image signal from an external equipment, thereby monitoring and/or recording and reproducing such image signal.

In such case, the joining detection devices 112, 211 do not detect the coupled state, so that the microcomputers 108, 208 supply the power source control units 110, 210 with commands to feed electric power to all the units.

On the other hand, in case the image pickup unit 100 and the image display unit 200 are integrally coupled by connection through the attaching/detaching devices 114, 213, the joining detection devices 112, 211 detects such coupled state, whereby the microcomputers 108, 208 supply the power source control units 110, 210 with commands to terminal power supply to the spectrum diffusion transmission unit 106, the spectrum diffusion reception unit 202, the image compression circuit 105 and the image expansion circuit 203 whereupon the power supply to these circuits is terminated. In this manner the electric power consumption can be reduced in the coupled state.

In case the both units are mutually separated, the image signal is transmitted with a reduced data amount obtained by compression, so that it can be transmitted without difficulty even by wireless digital transmission which is limited in the transmission rate. Also the use of the spectrum diffusion modulation allows transmission of the signal of a wide band with a limited electric power. On the other hand, in case with both units are mutually coupled, a high image quality can be obtained since the image signal is transmitted without compression.

In the following there will be explained a second embodiment.

The present embodiment employs, for the image compression, the JPEG compression method and the DV compression method. The JPEG compression method, capable of achieving a high compression rate for the image data, is suitable for image transmission in the wireless transmission channel limited in the transmission rate. The JPEG compression method is often employed in the personal computers as the image data format.

On the other hand, the DV compression method is widely employed in the digital CVR because of very high image quality, though the image data compression rate is not so high.

Figure 3:
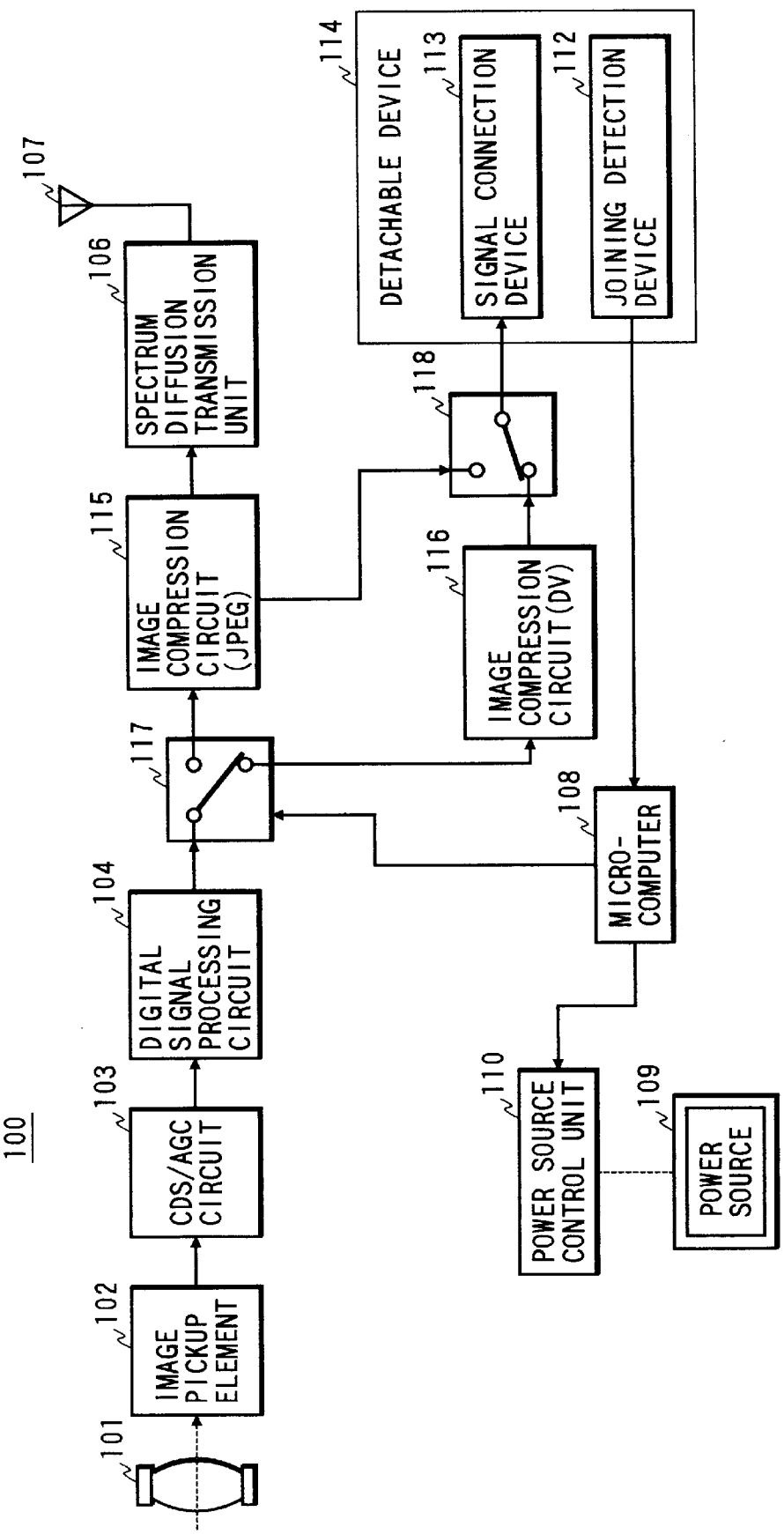
Figure 4:
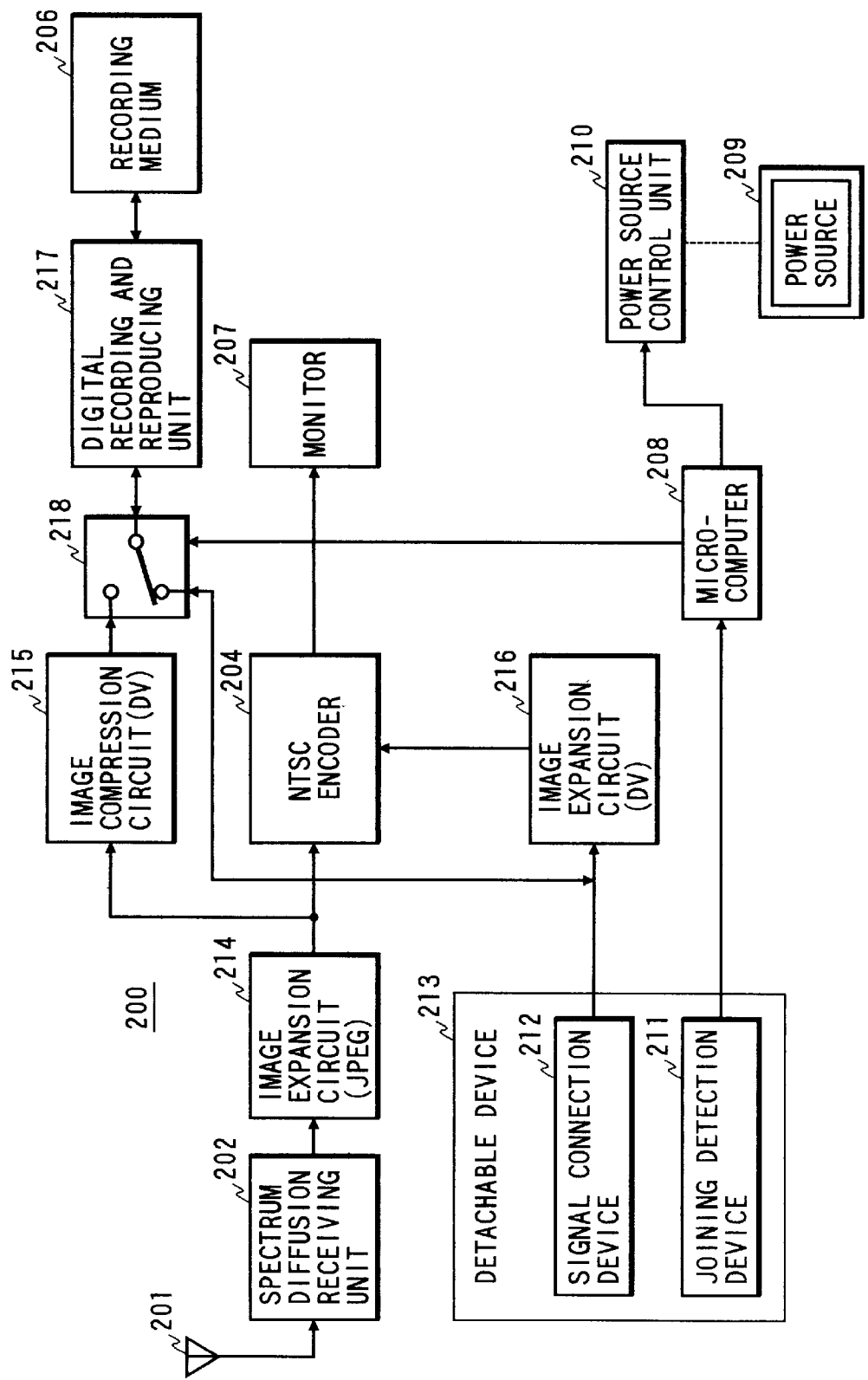

FIG. 3 shows the image pickup unit 100 in the second embodiment, and FIG. 4 shows the image display unit 200 therein.

In the image taking unit 100 shown in FIG. 3, there are provided a JPEG image compression circuit 115 for compressing, in the JPEG method, the digital image signal from the digital signal processing circuit 104, a DV image compression circuit 116 for compressing, in the DV method, the digital image signal from the digital signal processing circuit 104, a compression method selecting switch 117 for connecting the digital signal processing circuit 104 to the JPEG image compression circuit 115 or the DV image compression circuit 116 according to a command from the microcomputer 108, and a compression method selecting switch 118 shifted in linkage with the switch 117, for connecting the signal connecting device 113 to the JPEG image compression circuit 115 or the DV image compression circuit 116.

In the image display unit 200 shown in FIG. 4, there are provided a JPEG image expansion circuit 214 for expanding the JPEG compressed image to restore the digital image signal, a DV image compression circuit 215 for compressing, by the DV method, the digital image signal from the JPEG image compression circuit 214, a DV image expansion circuit 216 for expanding the DV compressed image data from the signal connecting device 212 to restore the digital image signal, a digital recording/reproducing unit 217 for digital recording and reproduction of the DV compressed image data on or from the recording medium 206, and an image selecting switch 218 for connecting the digital recording/reproducing unit 217 to the DV image compression circuit 215 or the signal connecting device 212 according to the command from the microcomputer 208.

In the above-explained configuration, when the image pickup unit 100 and the image display unit 200 are mutually separated, the joining detection devices 112, 211 do not detect the coupled state, so that the microcomputers 108 of the Image pickup unit 100 instructs the switch 117 to connect the digital signal processing circuit 104 to the JPEG image compression circuit 115. Also linked with the switch 117, the switch 118 connects the signal connecting device 113 to the JPEG image compression circuit 115. On the other hand, the microcomputer 208 of the image display unit 200 instructs the switch 218 to connect the digital recording/reproducing unit 217 to the DV image compression circuit 215.

In this state, the signal flows along paths of lens 101→image pickup device 102→CDS/AGC circuit 103→digital signal processing circuit 104→switch 117→JPEG image compression circuit 115→spectrum diffusion transmission unit 106→transmitting antenna 107→receiving antenna 201→spectrum diffusion reception unit 202→JPEG image expansion circuit 214→DV image compression circuit 215→switch 218→digital recording/reproducing unit 217→recording medium 206, and of JPEG image expansion circuit 214→NTSC encoder 204→monitor 207.

The JPEG compressed signal is released from the JPEG image compression circuit 115 through the switch 118 to the signal connecting device 113, it can be transmitted for example to the computer. Also the external DV compressed signal can be supplied to the image display unit 200 through the signal connecting device 212.

At the reproducing operation, the microcomputer 208 instructs the switch 218 to connect the digital recording/reproducing unit 217 to the DV image expansion circuit 216. In this state the signal flows along a path of recording medium 206→digital recording/reproducing unit 217→switch 218→DV image expansion circuit 216→NTSC encoder 204→monitor 207.

On the other hand, when the image pickup unit 100 and the image display unit 200 are integrally coupled, the joining detection devices 112, 211 detect the coupled state. The microcomputer 108 of the image pickup unit 100 instructs the switch 117 to connect the digital signal processing circuit 104 to the DV image compression circuit 116. Linked with the switch 117, the switch 118 connects the signal connecting device 113 to the DV image compression circuit 116. On the other hand, the microcomputer 208 of the image display unit 200 instructs the switch image selecting switch 218 to connect the digital recording/reproducing unit 217 to the signal connecting device 212.

In this state, the signal flows along paths of lens 101→image pickup device 102→CDS/AGC circuit 103→digital signal processing circuit 104→switch 117→DV image compression circuit 116→switch 118→signal connecting device 113→signal connecting device 212→switch 218→digital recording/reproducing unit 217→recording medium 206, and of signal connecting device 212→DV image expansion circuit 216→NTSC encoder 204→monitor 207.

In the reproducing operation, the signal flows along a path of recording medium 206→digital recording/reproducing unit 217→switch 218→DV image expansion circuit 216→NTSC encoder 204→monitor 207.

In the present embodiment explained above, when the image pickup unit 100 and the image display unit 200 are separated, the JPEG method is selected for image compression, whereby the wireless transmission can be achieved in efficient manner.

When the image taking unit 100 and the image display unit 200 are integrally coupled, the DV method is selected for image compression, thereby achieving digital image recording of high image quality.

Figure 5:
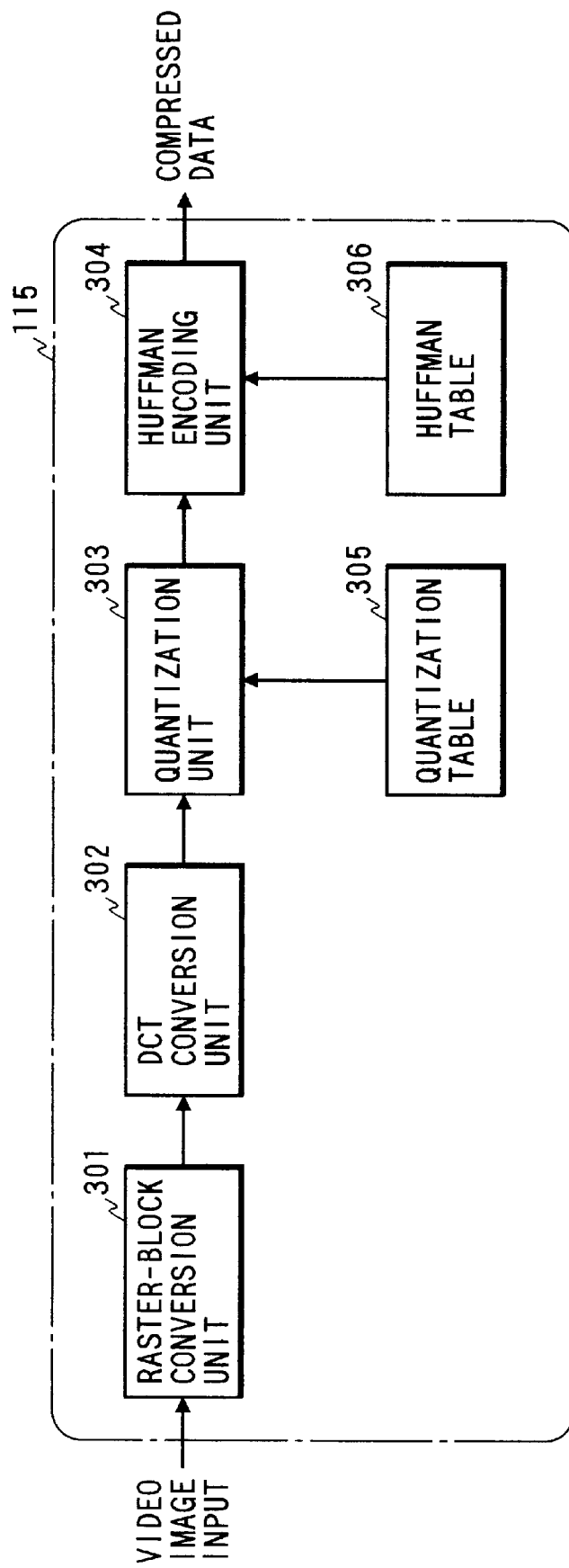

FIG. 5 is a block diagram showing the configuration of the JPEG image compression circuit 115 in FIG. 3, wherein provided are a raster-block conversion unit 301, a DCT (discrete cosine transformation) unit 302, a quantization unit 303, a Huffman encoding unit 304, a quantization table 305 to be used in the quantization unit 303, and a Huffman table 306 to be used in the Huffman encoding unit 304.

In the JPEG image compression circuit 115 of the above-explained configuration, the input digital image signal consisting of luminance/color difference signals of raster format is divided by the raster block conversion unit 301 into blocks of 8×8 pixels, each represented by an 8×8 square matrix. Then the DCT unit 302 executes a DCT process (discrete cosine transformation) on the 8×8 matrix data. The transformed data, called DCT coefficients, are also 8×8 matrix data of which terms at the upper left part represent the magnitudes of the low frequency components of the original image while those at the lower right part represent the magnitudes of the high frequency components of the original image.

Then the quantization unit 303 executes divisions of the data in the above-mentioned matrix respectively, utilizing a coefficient table called the quantization table 305. The quantization table 305 is weighted in the high frequency components with respect to the low frequency components, so that the results of the divisions constitute matrix data of which values decrease progressively toward the higher frequency. Subsequently there is executed quantization to reduce the values less than a predetermined value to zero, whereby most values in the lower right part of the matrix data become zero.

Then the above-mentioned matrix data are arranged as a data train in an order called zigzag scan, and are subjected to a transformation called Huffman encoding in the Huffman encoding unit 304. This transformation replaces a redundant portion of the data (a data portion where a same value appears in continuation). In the above-mentioned data train, the portion with value 0 in continuation is significantly shortened, whereby the amount of the image data is compressed.

Figure 6:
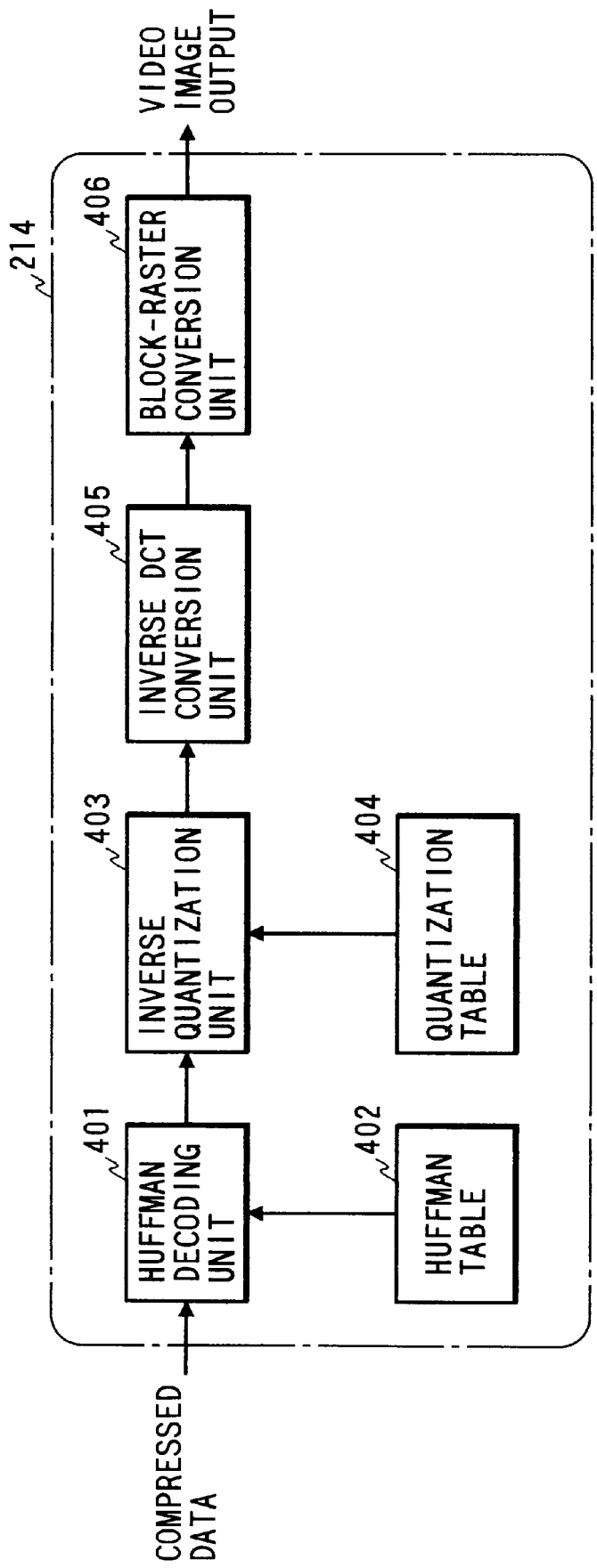

FIG. 6 is a block diagram showing the configuration of the JPEG image expansion circuit 214 in FIG. 4, wherein provided a Huffman decoding unit 401, a Huffman table 402 to be used in the Huffman decoding unit 401, an inverse quantization unit 403, a quantization table 404 for be used in the inverse quantization unit 403, an inverse DCT unit 405, and a block-raster conversion unit 406.

In the JPEG image expansion circuit 214 of the above-explained configuration, the input JPEG compressed image signal is subjected to Huffman decoding in the Huffman decoding unit 401 to provide the original data train. This data train is returned to the matrix data, which are subjected to multiplications in the inverse quantization unit 403 based on the quantization table 404. The matrix data obtained in this state contain a larger number of 0 in the higher frequency components, in comparison with the aforementioned DCT coefficients. Then the inverse DCT unit 405 executes an inverse DCT and the block-raster conversion unit 406 rearranges the blocks in the original order, thereby providing the expanded digital image.

Figure 7:
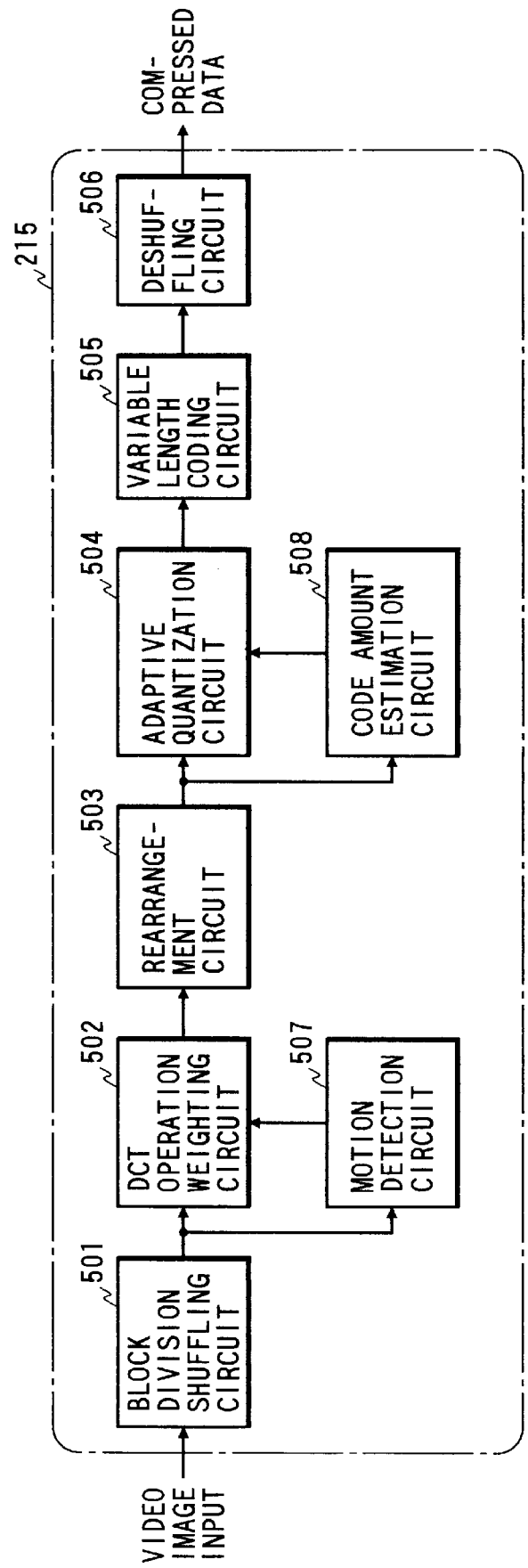

FIG. 7 shows the configuration of the DV image compression circuit 215 in FIG. 4, wherein provided a block division shuffling circuit 501, a DCT operation weighing circuit 502, a rearrangement circuit 503, an adaptive quantization circuit 504, a variable length encoding circuit 505, a deshuffling circuit 506, a motion detection circuit 507 and a code amount estimation circuit 508.

In the configuration explained above, the data with converted transmission rate are converted, in the block division shuffling circuit 501, into blocks of 8×8 pixels each, in each of the luminance signal and the two color difference signals, and a macroblock is constituted by six blocks consisting of four Y signal blocks and two color difference signal blocks. The divided data are then subjected to a rearrangement of the positions on the image in order to average the amount of information constituting the portion of a fixed length, and are subjected to the DCT operation (discrete cosine transformation) in the DCT operation weighing circuit 502. In this operation, an image with a large amount of motion is processed within a frame, and the motion detection circuit 507 is provided for this purpose. After the DCT operation, the data are weighted, rearranged by the rearrangement circuit 503, and quantized by the adaptive quantization circuit 504. The quantized data are subjected to variable length coding (VLC) in the variable length encoding circuit 505, in such a manner that the amount of codes after variable length encoding becomes constant for every macroblock, by estimating the amount of codes at the quantization. The encoded data are outputted after being returned to the original position in the image. The output digital signal is given an error correction code, and deshuffled by the deshuffling circuit 506, whereby compressed data are outputted.

In the following there will be explained a third embodiment.

Figure 8:
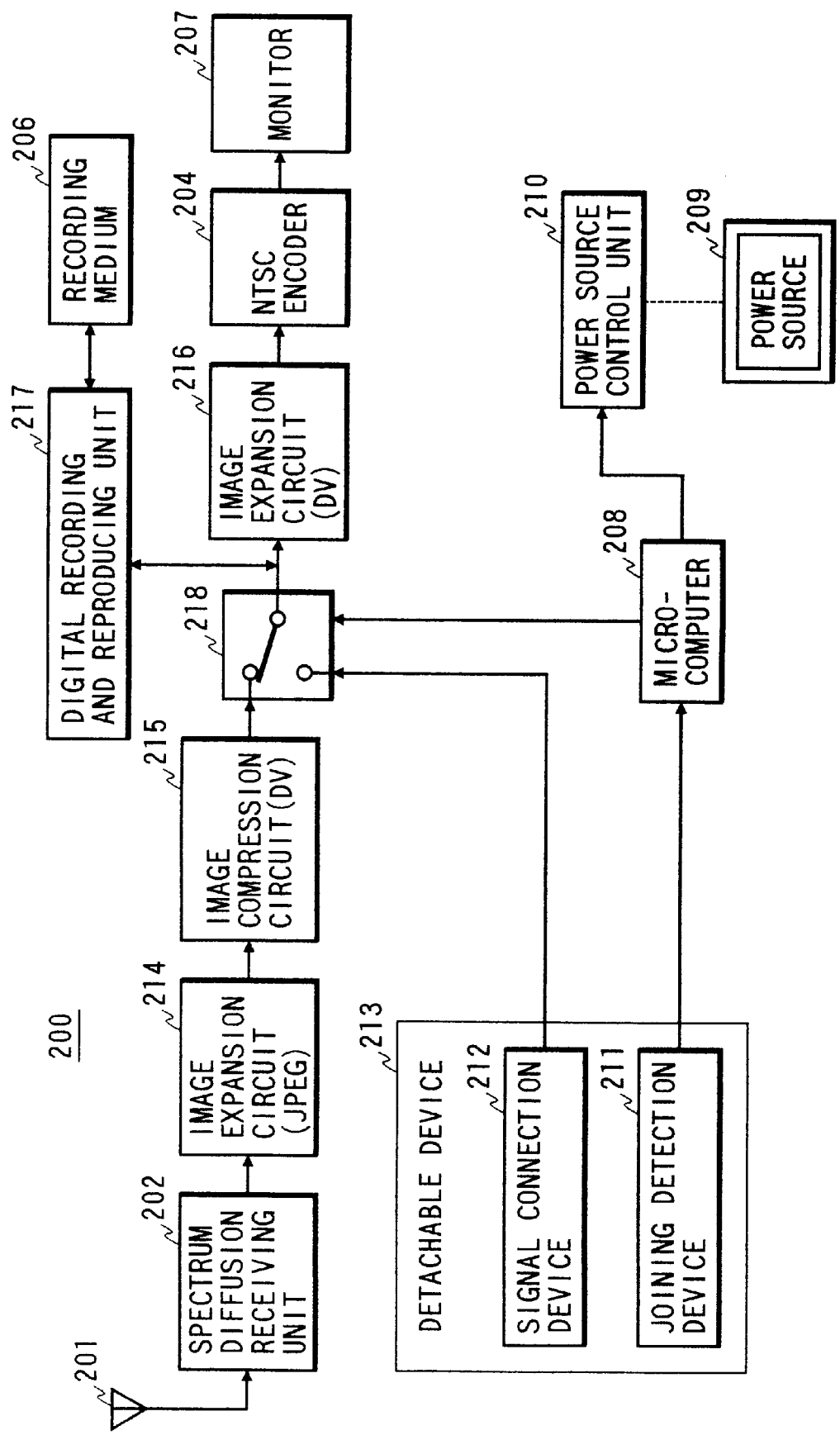

In this embodiment, the image pickup unit 100 is identical, in configuration, with that shown in FIG. 3 in the second embodiment, but the image display unit 200 has a configuration shown in FIG. 8, which is different in the arrangement of the various units from that shown in FIG. 4.

In the above-mentioned configuration, when the image pickup unit 100 and the image display unit 200 are mutually separated, the signal flows along paths of lens 101→image pickup device 102→CDS/AGC circuit 103→digital signal processing circuit 104→switch 117→JPEG image compression circuit 115→spectrum diffusion transmission unit 106→transmitting antenna 107→receiving antenna 201→spectrum diffusion reception unit 202→JPEG image expansion circuit 214→DV image compression circuit 215→switch 218→digital recording/reproducing unit 217→recording medium 206, and of switch 218→DV image expansion circuit 216→NTSC encoder 204→monitor 207.

At the reproducing operation, the signal flows along a path of recording medium 206→digital recording/reproducing unit 217→DV image expansion circuit 216→NTSC encoder 204→monitor 207.

On the other hand, when the image pickup unit 100 and the image display unit 200 are integrally coupled, the signal flows along paths of lens 101→image pickup device 102→CDS/AGC circuit 103→digital signal processing circuit 104→switch 117→DV image compression circuit 116→switch 118→signal connecting device 113→signal connecting device 212→switch 218→digital recording/reproducing unit 217→recording medium 206, and of switch 218→DV image expansion circuit 216→NTSC encoder 204→monitor 207.

At the reproducing operation, the signal flows along a path of recording medium 206→digital recording/reproducing unit 217→DV image expansion circuit 216→NTSC encoder 204→monitor 207.

In the following there will be explained a fourth embodiment.

Figure 9:
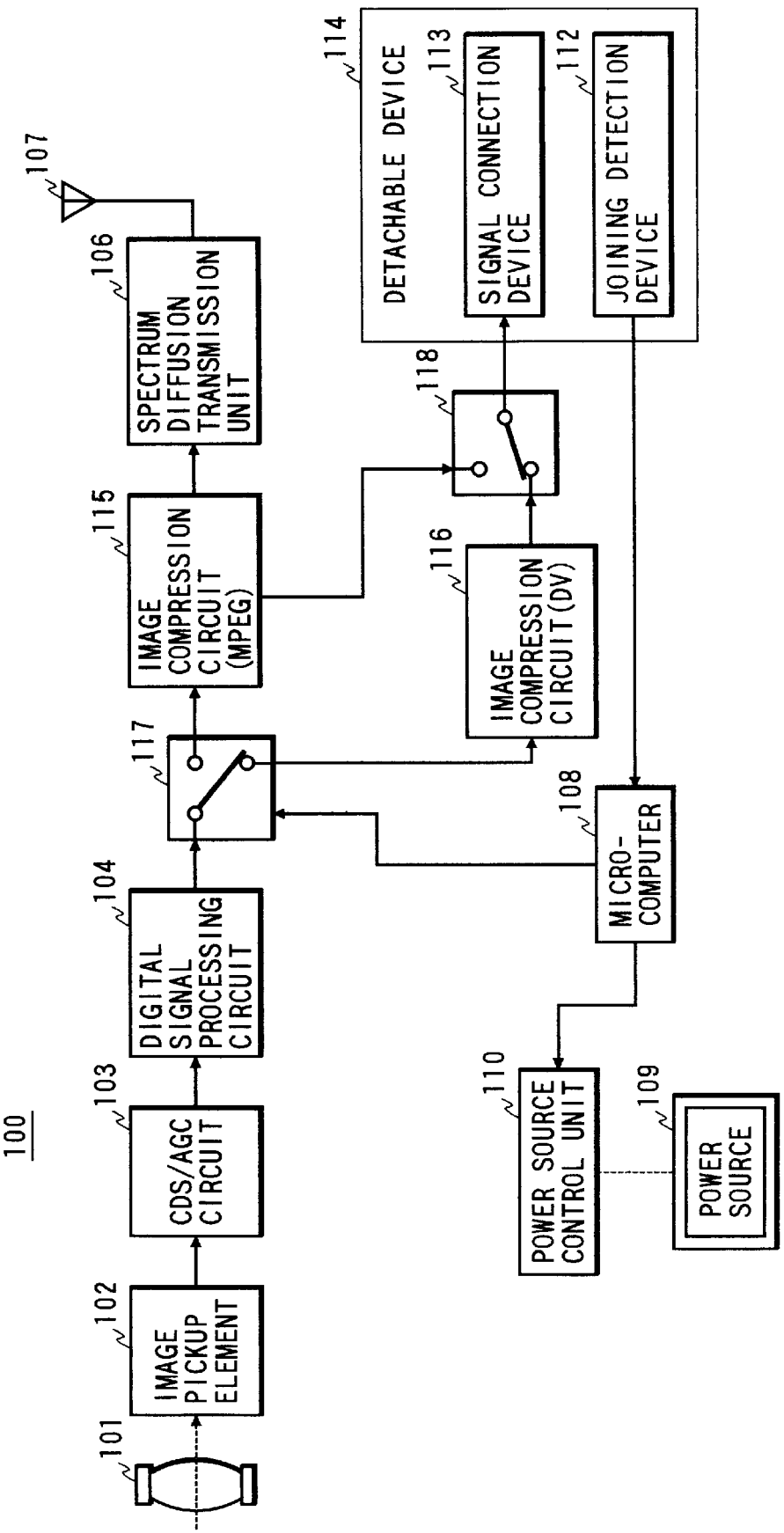
FIG. 9 is a block diagram showing an image taking unit in a fourth embodiment.
Figure 10:
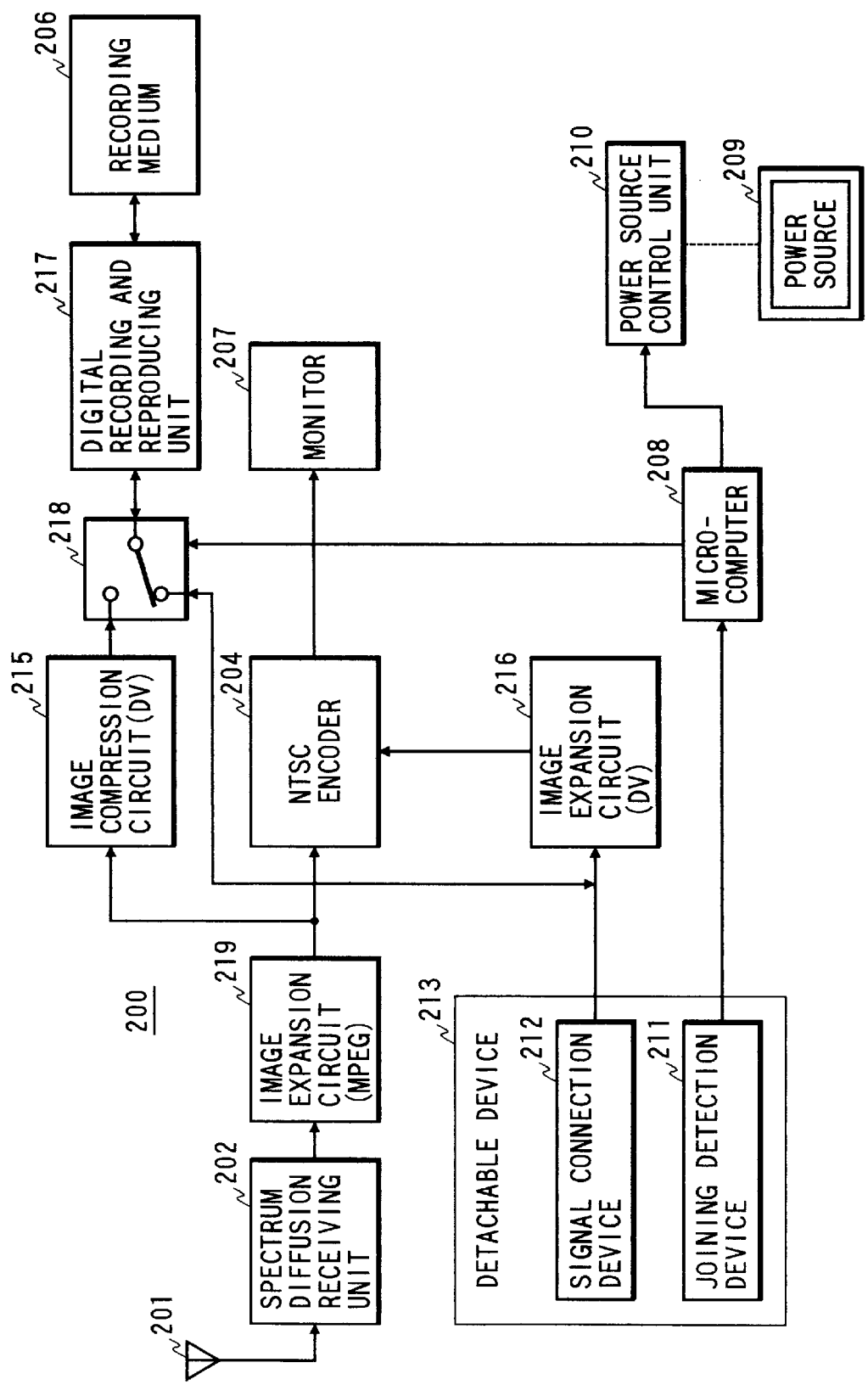
FIG. 10 is a block diagram showing an image display unit in the fourth embodiment.

This embodiment employs MPEG compression method instead of the JPEG compression method in the second and third embodiments. Consequently the image pickup unit 100 is provided, as shown in FIG. 9, with an MPEG image compression circuit 119, and the image display unit 200 is provided, as shown in FIG. 10, with an MPEG image expansion circuit 219. The remaining parts in FIG. 9 correspond to those in FIG. 3, and the remaining parts in FIG. 10 correspond to those in FIG. 4. Also the signal paths in the recording and reproducing operations are similar to those in the configurations shown in FIGS. 3 and 4.

Figure 11:
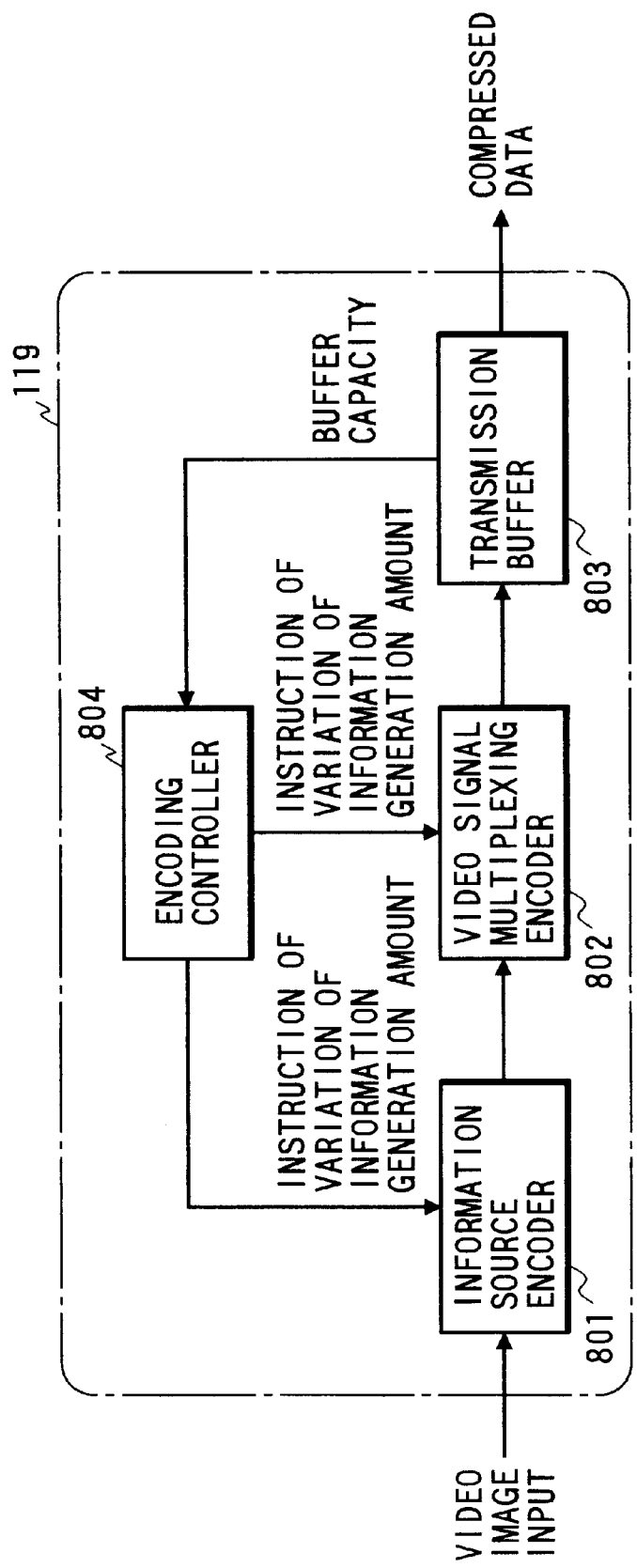
FIG. 11 is a block diagram of an MPEG image compression circuit.

FIG. 11 is a block diagram showing the configuration of the MPEG image compression circuit 119, wherein provided are an information source encoder 801 for compressing the amount of input information by effecting the aforementioned DCT, quantization etc., a video signal multiplexer 802 for converting thus compressed data into data based on the MPEG format, a transmission buffer 803 for transmitting the data of the above-mentioned format at a predetermined data rate, and an encoding controller 804 for increasing or decreasing the amount of the generated information.

Figure 12:
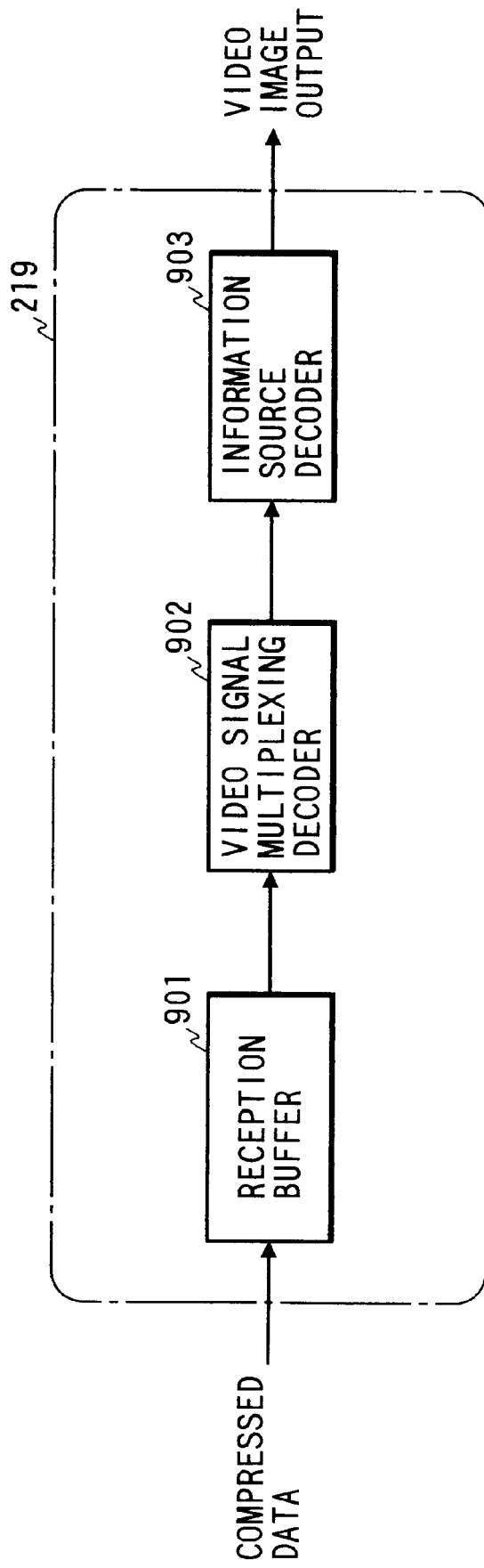
FIG. 12 is a block diagram of an MPEG image expansion circuit.
Figure 13:
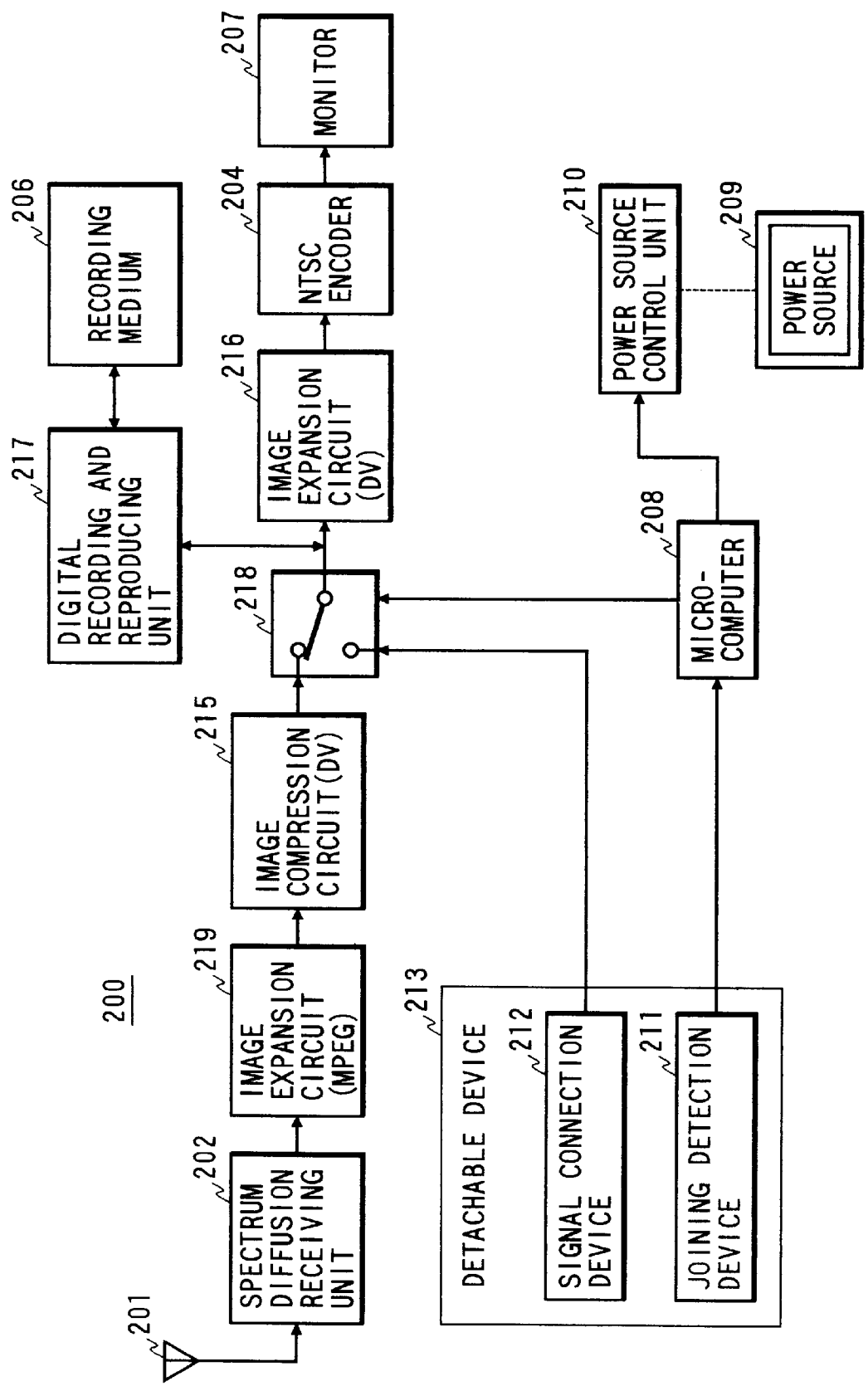
FIG. 13 is a block diagram showing an image display unit in the fifth embodiment.
Figure 14:
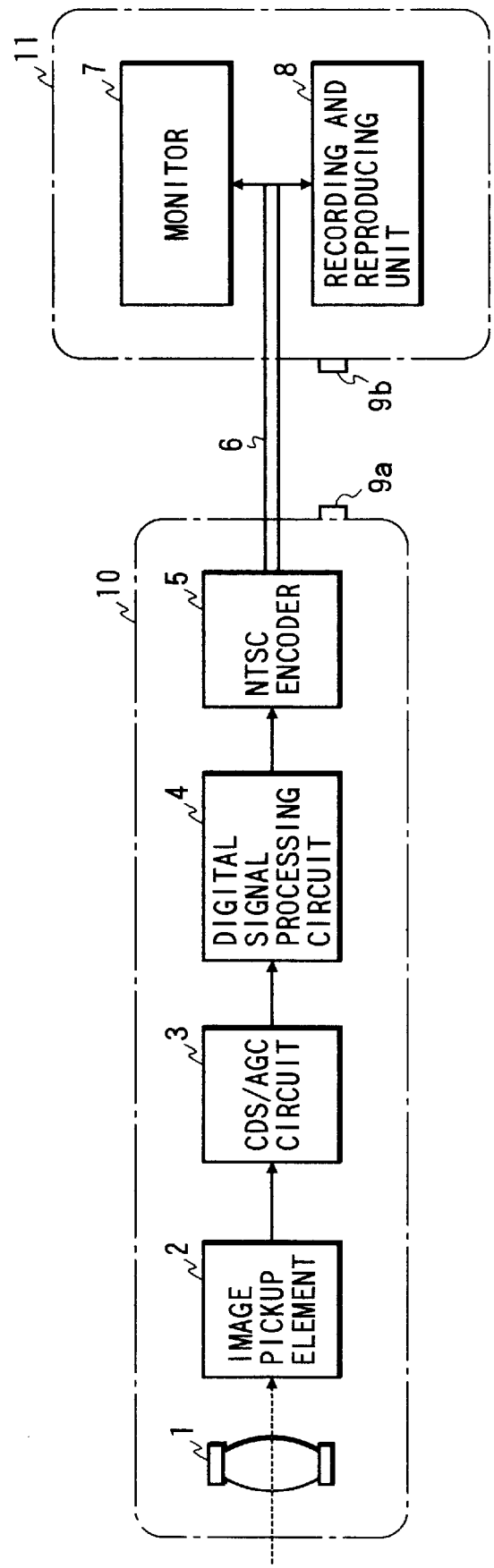
FIG. 14 is a block diagram of a conventional camcorder.

FIG. 12 is a block diagram showing the configuration of the MPEG image expansion circuit 219, wherein provided are a reception buffer 901 for securing a decoding process time for the received data, a video signal demultiplexer 902 for extracting the compressed data from the received format data, and an information source decoder 903 for restoring the original image signal by inverse quantization, inverse DCT etc.

The MPEG compression method is featured by executing, in the information source encoder 801, an anticipated encoding of representing the object image in the form of the difference from a past image or the difference from an anticipated image estimated from the past image, in addition to the aforementioned DCT and quantization, and can provide a higher compression rate, in comparison with the JPEG method which provides a series of compressed images each completed within an image frame.

In the following there will be explained a fifth embodiment.

This embodiment employs the MPEG compression method in the third embodiment shown in FIG. 8, instead of the JPEG compression method therein. Consequently the image display unit 200 is provided with an MPEG image expansion circuit 219 but is same in other parts as the configuration shown in FIG. 8. The image pickup unit 100 is same as that shown in FIG. 9. Also the signal flow paths in the recording and reproducing operations are same as those in the third embodiment.

In the foregoing embodiments, when the image pickup device and the image display device are mutually separated, the image pickup device can send the compression encoded image data to the image display device by wireless transmission, without the connecting cable and with a reduced data amount, whereby the freedom of the image pickup operation can be increased. Also when the image pickup device and the image display device are integrally coupled through the connection means, the image pickup device can directly transmit the image data through the connection means.

Also satisfactory image transmission can be achieved by selecting two suitable compression methods. In particular, the JPEG compression method enables efficient transmission when the image pickup device and the image display device are mutually separated, and the DV compression method allows to improve the image quality when the devices are integrally coupled.

Also the electric power consumption can be saved by interrupting the power supply to the unnecessary circuits, when the devices are integrally coupled.

It is also rendered possible, in the separated state of the devices, to send the image data to an external equipment from the connection means of the image pickup device, and to supply the connection means of the image display device with external image data and to display such image data.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup device comprising:
   image pickup means for pickup of the image of an object;
   first compression encoding means for effecting compression encoding of the image data from said image pickup means with a first compression method;
   second compression encoding means for effecting compression encoding of the image data from said image pickup means with a second compression method;
   wireless transmission means for modulating first image data compression encoded by said first compression encoding means and transmitting the first image data to a display device for displaying the image picked up by said image pickup means, through a wireless transmission channel;
   connection means adapted to be electrically and mechanically connected, in a detachable manner, to the display device for transmitting second image data compression encoded by said second compression means;
   detecting means for detecting that said display device is connected to said connection means; and
   selection means for selecting said second compression encoding means and providing said connection means with the second image data, in the case that the connection of the display device is detected by said detection means, and selecting said first compression encoding means and providing said wireless transmission means with the first image data, in the case that said connection is not detected.

2. An image pickup device according to claim 1, wherein said first compression method is JPEG compression method and said second compression method is DV compression method.

3. An image pickup device according to claim 1, wherein said first compression method is the MPEG compression method and said second compression method is the DV compression method.

4. An image pickup device according to claim 1, further comprising control means adapted to detect that said display device is connected to said connection means, and, in response to said detection, to restrict the supply of power to said first compression encoding means and said wireless transmission means.

5. An image pickup device according to claim 1, wherein said wireless transmission means is adapted to effect spectrum diffusion modulation on said image data.

6. An image pickup device according to claim 1, wherein said first compression encoding means is adapted to compress the image data by a thinning-out process.

7. A display device comprising:
   wireless reception means for receiving first image data from a wireless transmission channel, which first image data is compression encoded with a first compression method and modulated, and demodulating the first image data;
   first expansion means for expanding the first image data received from said wireless reception means;
   connection means adapted to be electrically and mechanically connected, in a detachable manner, to an image pickup device and to receive second image data from said image pickup device, which second image data is compression encoded with a second compression method;
   second expansion means for expanding the second image data received from said connection means;
   detection means for detecting that the image pickup device is connected to said connection means;
   selection means for selecting the second image data from said second expansion means in the case that the connection of the image pickup device is detected, and selecting the first image data from said first expansion means in the case that said connection is not detected;
   signal processing means for selectively inputting the first or second image data and processing said input image data to output an image signal of a predetermined format; and display means for displaying the image signal of said predetermined format.

8. A display device according to claim 7, further comprising recording and/or reproducing means for recording and/or reproducing the image signal obtained from said signal processing means on or from a recording medium.

9. A display device according to claim 8, further comprising:

compression encoding means for effecting compression encoding of the first image data, obtained from said first expansion means, with the second compression method; and a display device;

wherein said selection means is further adapted to select the second image data from said second expansion means in the case that the connection for the image pickup device is detected, and the first image data from said compression encoding means in the case that said connection is not detected, and wherein said recording and/or reproducing means records and/or reproduces said selected image data on and/or from a recording medium.

10. A display device according to claim 7, further comprising:

compression encoding means for effecting compression encoding of the first image data, obtained from said first expansion means, with the second compression method; and a display device;

wherein said selection means is further adapted to select the second image data from said second expansion means in the case that the connection of the image pickup device is detected, and to select the first image data from said compression encoding means in the case that said connection is not detected, and wherein said second expansion means expands said selected image data and providing said processing means with said expanded image data.

11. A display device according to claim 13, further comprising recording/reproducing means for recording or reproducing said selected image data on or from a recording medium.

12. A display device according to claim 7, further comprising control means adapted to detect that the image pickup device is connected to said connection means, and, in response to said detection, to terminate the supply of power to said wireless reception means and said first expansion means.

13. A display device according to claim 7, wherein said first compression method is JPEG compression method and said second compression method is DV compression method.

14. A display device according to claim 7, wherein said first compression method is MPEG compression method and said second compression method is DV compression method.

15. A display device according to claim 7, wherein said wireless reception means is adapted to demodulate image data subjected to spectrum diffusion modulation.

16. A display device according to claim 7, wherein said demodulated image data are image data compressed by thinning-out, and said first expansion means is adapted to expand said image data by interpolation.

17. A display device according to claim 7, wherein said signal processing means is adapted to output an image signal of NTSC system.

18. An image pickup system comprising:

an image pickup device including;

image pickup means for pickup of the image of an object;

first compression encoding means for effecting compression encoding of said image data from said image pickup means with a first compression method;

second compression encoding means for effecting compression encoding of the image data from said image pickup means with a second compression method;

wireless transmission means for modulating first image data compression encoded by said first compression encoding means and transmitting the first image data to a display device for displaying the image data picked up by said image pickup means, through a wireless transmission channel;

first connection means adapted to be electrically and mechanically connected, in a detachable manner, to a display device for transmitting second image data compression encoded by said second compression means, said display device including wireless reception means for receiving said first image data from the wireless transmission channel and demodulating the first image data;

first detection means for detecting that the display device is connected to said first connection means;

first selection means for selecting said second compression encoding means and providing said first connection means with the second image data, in the case that the connection of the display device is detected by said first detection means, and selecting said first compression encoding means and providing said wireless transmission means with the first image data, in the case that said first connection is not detected;

first expansion means for expanding the first image data received from said wireless reception means;

second connection means adapted to be electrically and mechanically connected, in a detachable manner, to an image pickup device and to receive second image data from said image pickup device;

second expansion means for expanding the second image data received from said second connection means;

second detection means for detecting that the image pickup device is connected to said second connection means;

second selection means for selecting the second image data from said second expansion means in the case that the connection of the image pickup means is detected, and selecting the first image data from said first expansion means in the case that said connection is not detected;

signal processing means for selectively inputting the first or second image data and processing said input image data to output an image signal of a predetermined format; and display means for displaying the image signal of said predetermined format.

* * * * *